United States Patent Office 2,738,070
Patented Mar. 13, 1956

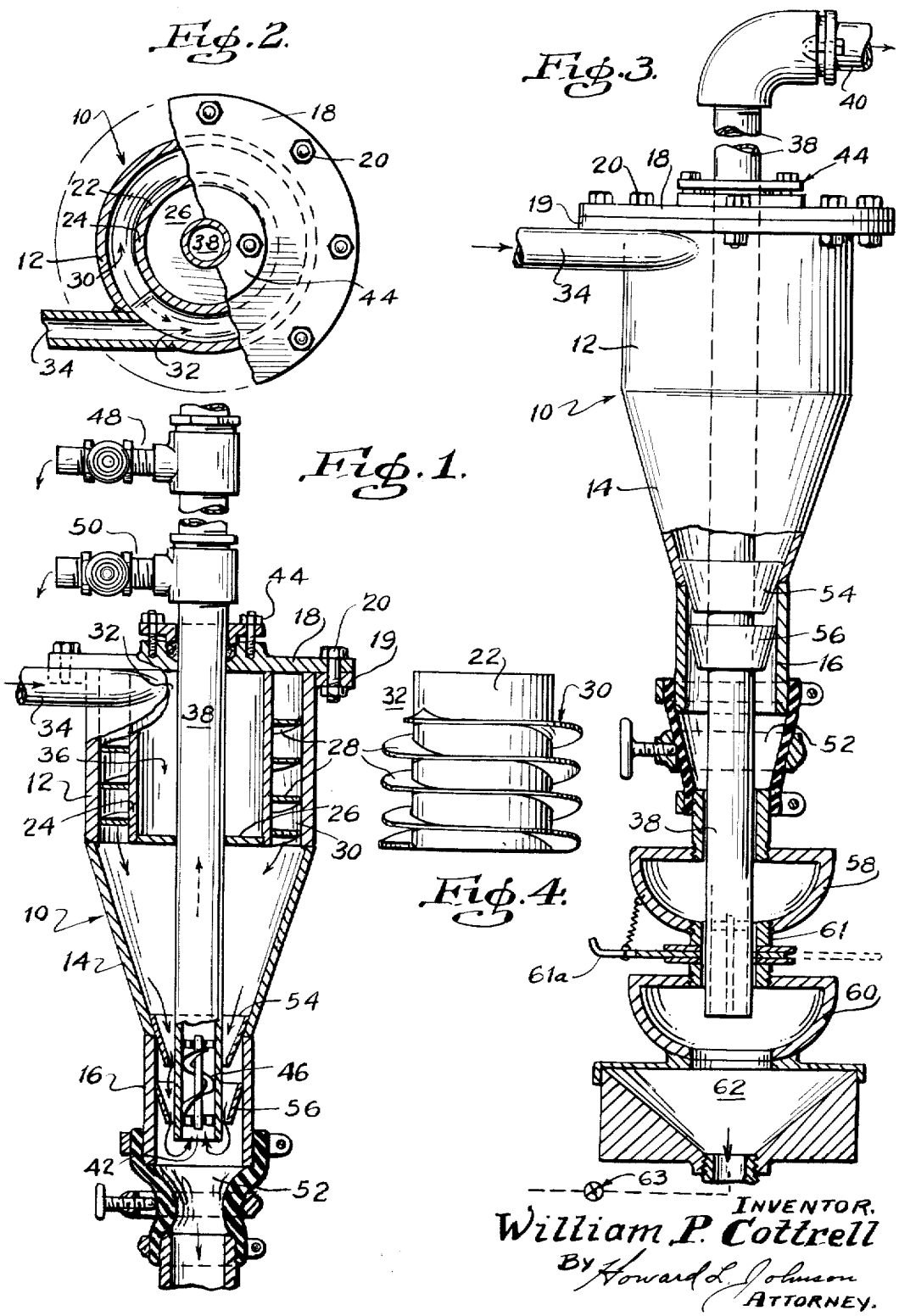

2,738,070

GRAVITY SEPARATOR

William P. Cottrell, Los Angeles, Calif.; Irene Cottrell, executrix of William P. Cottrell, deceased Application March 6, 1950, Serial No. 147,865

4 Claims. (Cl. 209—211)

This invention relates to an apparatus for separating solids of different size or gravity, from a directed current of such mixed solids suspended in a fluid such as air or water.

In a preferred embodiment my invention superficially resembles a cyclone-type dust separator in structure, and is provided with adjustable means for simultaneously withdrawing solids of diverse physical and/or chemical structure from different stations or levels of the whirling fluid within the separator.

Accordingly it is a purpose of the invention to separate two or more solid components of a liquid or gaseous suspension in an improved and highly efficient manner.

Another object is to provide an improved cyclone separator having an inner peripheral worm or helical chute for imparting a whirling motion to the suspension before it is thrown into a lower expansion chamber. From the latter, the lighter and heavier solids are continuously withdrawn from different levels, the bulk of the suspending fluid generally being taken off with the lightest solid fraction. The present apparatus has no moving parts or mechanism, it being understood however that the suspension is fed to the separator under suction or pressure; this pressure may be provided by a pump, a gravity feed or other means but this is not part of the present invention.

Other objects and advantages will be apparent as the description proceeds.

In the drawings, which form part of the present specification:

Figure 1 is a vertical sectional view of my new separator, partly in elevation;

Figure 2 is a top plan view thereof with a portion of the cover broken away;

Figure 3 is a side elevational view of the separator with the lower portion seen in vertical section;

Figure 4 is an elevational view of the worm or rotary chute shown removed from the separator.

In the embodiment of my invention as shown in Figures 1–4, there is provided a generally funnel-shaped vessel 10 consisting of an upper cylindrical section 12 and a lower frusto-conical portion 14 terminating in a bottom restricted outlet 16. A centrally apertured cover plate 18 is secured to an upper flange 19 of the cylinder by bolts 20 or the like.

Within the cylindrical section 12 is a guide core 22 (Fig. 4) consisting of a cylindrical wall 24 having a centrally apertured bottom 26 and a laterally projecting fin 28 wound about its outer face in a helical path to form a "worm" or spiral chute 30 which empties into the conical space 14. It will be noted however that the fin 28 does not extend all the way to the top of the core 22 or outer cylindrical wall 12 but stops below the top 18 a distance equal at least to the vertical separation of successive turns or loops of the worm 28. In line with this upper annular passage 32 and tangentially directed with respect to the core 22 and cylinder 12 is an inlet or feed conduit 34. Accordingly it will be seen that the suspension forced into the cylinder 12 thru conduit 34, can make (at least one) complete revolution about the passage 32 before descending along the chute 30. Travel thru the latter gives the suspension a rotary or whirling motion which continues when the suspension enters the conical chamber 14, and in this latter chamber the lighter gravity or more finely divided solids tend to rise toward the top, and the heavier or coarser solids gravitate to the bottom.

It should be noted that the cross section or capacity of the chute is approximately the same as the inlet, while the conical section 14 is like an "expansion chamber" in which the volume of suspension is maintained by the restricted outlet 16. This is advantageous, first, in that the compact structure of the chute insures that the inlet pressure does not fall off greatly (as might be the case if the inclosed center space 36 were open to the inlet line); and secondly, that the entire suspension stream is positively rotated at substantially the same rate.

Centrally located within the cylinder 12 and core 22 is (one or more) vertical tubes 38 open at both ends, the top 40 providing an outlet, and the bottom an inlet 42 disposed within the conical section 14. The tube is longitudinally adjustable thru the apertured cover 18 and core bottom 26 (manually or otherwise), being held at any predetermined position by the packing gland 44. Accordingly the bottom inlet 42 of the tube can be raised level with the bottom wall 26 of the core (or even up to the cover plate 18 in the absence of the wall 26). On the other hand, it can be lowered thru the cone 14 and outlet 16 any desired amount. It will thus be seen that the tube draws off the lighter or finer solids from the suspension, and the location of its mouth 42 determines (for a given rate of flow) what fraction will be separated.

Still further fractionation may be obtained by the construction of the adjustable tube 38. A spiral fin or worm 46 may be placed (at any height) within the tube to impart additional rotary motion to the material moving up the tube. The effect of this is to decrease the amount of heavy material coming up. Further, since the finest material will rise the furthest up the tube, different character concentrates can be withdrawn from different levels of the tube as by the lateral outlets 48, 50. Most of the suspending fluid (e. g. water), being lighter than the lightest portion of solids, will come out the top. The same is true of a gaseous suspending fluid (e. g. air) is used.

The back pressure at the lower outlet can be positively regulated by a pinch valve 52 and the movement of material thru the outlet is further slowed down by inner tapered baffles or collars 54, 56. When it is desired to extend the outlet below this level (as to accommodate the lowered pick-up tube 38), successive, bowl-shaped segments 58, 60 may be threadedly coupled together to serve as "expansion chambers," separated by a narrower conduit 61 with a transversely sliding cut-off 61a. Instead of continuously withdrawing the heavier material from the bottom, a settling chamber 62 can be connected thereto with a discharge valve 63 which may be opened only intermittently as the heavier material accumulates therein and it is desired to draw it off. This construction is particularly applicable when using air or other gas as the suspending fluid. In such case, continuous movement of the air stream thru the separator may be effected by a vacuum or suction applied to the fractionating outlet 40.

While the suspending fluid used in my fractionating process will in most cases for practical reasons be water, since this is generally the cheapest and most available liquid to add to aggregates, other liquids could similarly be used. Likewise there are many examples of separating solids wherein the solids are not obtained in a dry form to which a liquid is added, but are obtained already admixed as in the case of mud, marine and placer deposits, latex, milk, and chemical reaction products which are formed in a liquid medium.

In addition, air or other gas (in particular hydrogen, nitrogen and other inert gases) may form the suspending fluid—either originally or by addition—for fractionating or separating light aggregates. Thus the present apparatus can be used, for example, to remove solid particles from currents of dust, lint, soot, slag fumes, and finely divided mineral material (cement, pearlite, asbestos, etc.).

My invention is particularly applicable for separating mineral ore (e. g. lead, iron, tungsten) from the gangue even when the two are ground to the same fineness, as long as they differ in density. For example, it can separate mica and graphite of the same mesh; also coal from shale; the mica or coal go thru the fractionating tube, the other out the bottom. Or with material of the same density, such as sand and gravel, the material can be divided into portions of different size or fineness. Another example, 500 lbs. gravel suspended in 10 parts water to 1 part gravel was passed thru one of my devices built with 10 inch. top internal diameter, 2 in. inlet and 2½ in. fractionating tube and in 12 minutes there was obtained from the fractionating tube all of the finer than 200 mesh gravel (about 10%) while the 16 to 200 mesh gravel, freed from the bulk of the water, was emitted from the main outlet. The feed pressure was about 30 p. s. i.

With the same size unit, a mixture of 30 mesh lead-zinc ore (10%) and gangue (90%), diluted with 11 parts water was passed at the rate of 490 lbs. solid in 14 minutes. The ore was concentrated to 52%; 85% of the gangue came off in the overflow. A mixture of 20 mesh mica and rock was similarly separated by using air as the suspending fluid.

With a 6 inch top internal diameter conical chamber, a mixture of sand and clay, diluted with 12 parts of water, was passed thru at the rate of 1½ tons per hour. All the clay above 200 mesh (representing 18% of the total solids) was obtained from the bottom. Again, with the same size unit, a mixture of tungsten sheelite and gangue of 20 mesh, diluted with 8 parts of water, was passed thru the device at 3 tons per hour. 1.1% of tungsten sheelite in the original solid mixture was concentrated to 28% in the first run; the other fraction consisted of 45% water and 55% solids; 85% of the tungsten was thus recovered. Again, with the same unit, 10% graphite of a solid mixture with mica, diluted 12 to 1 with water, was concentrated to 70% graphite in one run at a rate of 2 tons per hour; the mica fraction was 55% water and 45% solids.

Generally my vessels are fabricated with about 6 to 25 inch internal upper diameter altho this is not critical. It is usually desirable to have 50% volume of fluid, and it may be as much as 100 parts to 1 part solid. Materials of similar density are processed at slower velocities (less pressure) and consequently increased volume of fluid. In the above example of coal and shale, 20 p. s. i. was used with a suspension having 2 to 40% solid content. From ¼ mesh to very fine coal could be readily separated. In general, fluid pressure may be from any minimum which will cause the fluid to run (one foot head of water, for instance) up to 300 p. s. i. or more. The same results can be obtained at different pressures as well as different dilutions by adjustment of the fractionating tube; the optimum conditions for any given material can readily be ascertained by the operator.

While I have shown and described in some detail a presently preferred embodiment of my gravity separator, it is to be understood that various modifications may be made in the construction and operation thereof within the spirit and scope of the subsequently claimed invention which it is my intention to claim broadly within the limitations imposed by the prior art.

I claim:
1. A separator for suspensions comprising in combination, an upper cylindrical section having a top member; a lower frusto-conical section depending from said cylindrical section, the base of said frusto-conical section being of substantially the same diameter as the cylindrical section and having a restricted outlet at its apex; a guide core depending from said top member and spaced from the inner surface of said cylindrical section; a laterally projecting fin in the space between said core and the inner surface of said cylindrical section, and being helically arranged therein to form a helical guide-way; an inlet tube for delivering a continuous flow of suspensions tangentially to the upper end of said cylindrical section and into said helical guide-way; said helical guide-way being so arranged that suspensions go substantially completely around the inside of said cylindrical section before descending in said helical guide-way, and which discharges said suspensions into the frusto-conical section at substantially the base thereof; and an upright outlet tubular member having a diameter slightly larger than said inlet and extending axially through said top member and having its mouth positioned in close proximity to said restricted outlet, the internal diameter of the upper cylindrical section being approximately five times the diameter of the inlet tube.

2. A separator for suspensions comprising in combination, an upper cylindrical section having an apertured top member; a lower frusto-conical section depending from said cylindrical section, the base of said frusto-conical section being of substantially the same diameter as the cylindrical section and having a restricted outlet at its apex; a guide core depending from said top member and spaced from the inner surface of said cylindrical section; a laterally projecting fin in the space between said core and the inner surface of said cylindrical section, and being helically arranged therein to form a helical guide-way; an inlet tube for delivering a continuous flow of suspensions tangentially to the upper end of said cylindrical section and into said helical guide-way; said helical guide-way being so arranged that suspensions go substantially completely around the inside of said cylindrical section before descending in said helical guide-way, and which discharges said suspensions into the frusto-conical section at substantially the base thereof; packing gland means secured to the outside of said top member around said aperture; and an upright outlet tubular member having a diameter slightly larger than said inlet and extending axially through said packing gland means on said top member and having its mouth positioned in close proximity to said restricted outlet, and being longitudinally adjustable through, and held in adjusted position by, packing gland means.

3. A separator for suspensions comprising in combination an upper cylindrical section having a top member; a lower frusto-conical section depending from said cylindrical section, the base of said frusto-conical section being of substantially the same diameter as the cylindrical section and having a restricted outlet at its apex; a guide core depending from said top member and spaced from the inner surface of said cylindrical section; a laterally projecting fin in the space between said core and the inner surface of said cylindrical section, and being helically arranged therein to form a helical guide-way; an inlet tube for delivering a continuous flow of suspensions tangentially to the upper end of said cylindrical section and into said helical guide-way; said helical guide-way being so arranged that suspensions go substantially completely around the inside of said cylindrical section before descending in said helical guide-way, and which discharges said suspensions into frusto-conical section at substantially the base thereof; the cross-section or capacity of said helical guide-way being approximately the same as that of said inlet; and an upright outlet tubular member having a diameter slightly larger than said inlet and extending axially through said top member and having its mouth positioned in close proximity to said restricted outlet.

4. A separator for suspensions comprising in combination an upper cylindrical section having an apertured top member; a lower frusto-conical section depending from said cylindrical section, the base of said frusto-conical section being of substantially the same diameter as the cylindrical section and having a restricted outlet at its apex; a guide core depending from said top member and spaced from the inner surface of said cylindrical section; a laterally projecting fin in the space between said core and the inner surface of said cylindrical section, and being helically arranged therein to form a helical guide-way; an inlet tube for delivering a continuous flow of suspensions tangentially to the upper end of said cylindrical section and into said helical guide-way; said helical guide-way being so arranged that suspensions go substantially completely around the inside of said cylindrical section before descending in said helical guide-way, and which discharges said suspensions into the frusto-conical section at substantially the base thereof; the cross-section or capacity of said helical guide-way being approximately the same as that of said inlet; packing gland means secured to the outside of said top member around said aperture; and an upright outlet tubular member having a diameter slightly larger than said inlet and extending axially through said packing gland means on said top member and having its mouth positioned in close proximity to said restricted outlet, and being longitudinally adjustable through, and held in adjusted position by, said packing gland means.

References Cited in the file of this patent

UNITED STATES PATENTS

| 1,149,463 | Pardee | Aug. 10, 1915 |
| 1,629,182 | Stull | May 17, 1927 |
| 1,701,942 | Andrews | Feb. 12, 1929 |
| 2,312,706 | Freeman | Mar. 2, 1943 |
| 2,346,005 | Bryson | Apr. 4, 1944 |
| 2,364,799 | Laughlin | Dec. 12, 1944 |
| 2,377,721 | Scott | June 5, 1945 |
| 2,433,178 | Ware | Dec. 23, 1947 |

FOREIGN PATENTS

| 23,469 of 1908 | Great Britain | Dec. 2, 1909 |
| 189,329 | Germany | Sept. 28, 1907 |
| 455,845 | Great Britain | Oct. 28, 1936 |

OTHER REFERENCES

Engineering and Mining Journal, vol. 148, No. 12, December 1947, pp. 74 and 75, How the Cyclone Works on Mineral Separations.

UNITED STATES PATENT OFFICE

CERTIFICATE OF CORRECTION

Patent No. 2,738,070 March 13, 1956

William P. Cottrell, deceased

It is hereby certified that error appears in the above numbered patent requiring correction and that the said Letters Patent should read as corrected below.

In the grant, lines 1 and 2, for "William P. Cottrell, of Los Angeles, California; Irene Cottrell, executrix of William P. Cottrell, deceased" read --William P. Cottrell, of Los Angeles, California, deceased, by Decree of Distribution to Irene Cottrell--; line 11, for "Irene Cottrell, as executrix, her successors or assigns" read --Irene Cottrell, by Decree of Distribution, her heirs or assigns--; in the heading to the printed specification, lines 3 and 4, for "William P. Cottrell, Los Angeles, Calif.; Irene Cottrell, executrix of William P. Cottrell, deceased" read --William P. Cottrell, Los Angeles, Calif., deceased, by Decree of Distribution to Irene Cottrell--.

This certificate supersedes Certificate of Correction issued June 5, 1956.

(SEAL)     Signed and sealed this 8th day of April 1958.

Attest:
KARL H. AXLINE

Attesting Officer

ROBERT C. WATSON
Commissioner of Patents

UNITED STATES PATENT OFFICE

CERTIFICATE OF CORRECTION

Patent No. 2,738,070                                                 March 13, 1956

William P. Cottrell, deceased

It is hereby certified that error appears in the above numbered patent requiring correction and that the said Letters Patent should read as corrected below.

In the grant, lines 1 and 2, for "William P. Cottrell, of Los Angeles, California; Irene Cottrell, executrix of William P. Cottrell, deceased" read --William P. Cottrell, of Los Angeles, California, deceased, by Decree of Distribution to Irene Cottrell--; line 11, for "Irene Cottrell, as executrix, her successors or assigns" read --Irene Cottrell, by Decree of Distribution, her heirs or assigns--; in the heading to the printed specification, lines 3 and 4, for "William P. Cottrell, Los Angeles, Calif.; Irene Cottrell, executrix of William P. Cottrell, deceased" read --William P. Cottrell, Los Angeles, Calif., deceased, by Decree of Distribution to Irene Cottrell--.

This certificate supersedes Certificate of Correction issued June 5, 1956.

(SEAL)        Signed and sealed this 8th day of April 1958.

Attest:
KARL H. AXLINE

Attesting Officer

ROBERT C. WATSON
Commissioner of Patents